(12) United States Patent
Yamane et al.

(10) Patent No.: US 11,908,033 B2
(45) Date of Patent: Feb. 20, 2024

(54) INFORMATION PROCESSING APPARATUS, INFORMATION PROCESSING SYSTEM, AND NON-TEMPORARY STORAGE MEDIUM

(71) Applicant: TOYOTA JIDOSHA KABUSHIKI KAISHA, Toyota (JP)

(72) Inventors: Josuke Yamane, Nisshin (JP); Naoya Oka, Nagakute (JP); Ryosuke Yamamoto, Nagoya (JP); Kaori Okuda, Ogaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 410 days.

(21) Appl. No.: 17/221,943

(22) Filed: Apr. 5, 2021

(65) Prior Publication Data

US 2021/0319530 A1 Oct. 14, 2021

(30) Foreign Application Priority Data

Apr. 8, 2020 (JP) ................................ 2020-069709

(51) Int. Cl.
G06Q 50/30 (2012.01)
H04W 4/12 (2009.01)
H04W 4/021 (2018.01)

(52) U.S. Cl.
CPC ............ *G06Q 50/30* (2013.01); *H04W 4/021* (2013.01); *H04W 4/12* (2013.01)

(58) Field of Classification Search
CPC ....... G06Q 50/30; G06Q 50/01; H04W 4/021; H04W 4/12; H04W 4/023; H04W 4/029;
(Continued)

(56) References Cited

U.S. PATENT DOCUMENTS

2003/0114171 A1* 6/2003 Miyamoto ............. H04W 4/02 455/457
2004/0049424 A1* 3/2004 Murray ............. G06Q 30/0217 705/14.69

(Continued)

FOREIGN PATENT DOCUMENTS

CN 104954984 A 9/2015
CN 107635190 A 1/2018
(Continued)

OTHER PUBLICATIONS

Intelligent_In-Car-Infotainment_Systems_A_Contextual_Personalized_Approach (Year: 2012).*
(Continued)

*Primary Examiner* — Gautam Ubale
(74) *Attorney, Agent, or Firm* — Sughrue Mion, PLLC

(57) ABSTRACT

The present disclosure creates a communication group with surrounding users during movement.
The present disclosure is an information processing system including a server and a user terminal. A server includes a first controller configured to: receive a group creation request of a communication group with a second user terminal that exists in a predetermined range from the first user terminal and is moving in the same direction as the first user terminal, from the first user terminal; create a communication group including users of the first and second user terminals; and notify the first and second user terminals that the communication group is created. A user terminal includes a second controller configured to: detect the second user terminal during movement; transmit the group creation request to the server; receive a notification that the communication group is created from the server; and notify the user that the communication group is created.

2 Claims, 9 Drawing Sheets

(58) Field of Classification Search
CPC .......... H04W 4/21; H04W 4/08; H04L 67/12; H04L 51/52; H04L 67/52
USPC ........................................................... 705/5
See application file for complete search history.

(56) References Cited

U.S. PATENT DOCUMENTS

| | | | | |
|---|---|---|---|---|
| 2010/0280748 | A1* | 11/2010 | Mundinger | G01C 21/3438 701/532 |
| 2012/0202428 | A1* | 8/2012 | Mirbaha | H04L 12/189 455/41.2 |
| 2013/0086164 | A1* | 4/2013 | Wheeler | H04W 4/023 709/204 |
| 2013/0137476 | A1* | 5/2013 | Kawaguchi | H04W 4/02 455/519 |
| 2013/0147638 | A1* | 6/2013 | Ricci | G06Q 30/0265 340/905 |
| 2013/0311222 | A1* | 11/2013 | Chaturvedi | G06Q 10/0639 705/7.15 |
| 2014/0046591 | A1* | 2/2014 | Boldyrev | H04L 12/1845 701/533 |
| 2014/0143054 | A1* | 5/2014 | Celik | G06Q 10/087 705/14.54 |
| 2016/0048777 | A1* | 2/2016 | Kitagawa | G06Q 10/025 705/6 |
| 2016/0187150 | A1* | 6/2016 | Sherman | G06Q 10/063114 705/7.15 |
| 2016/0320198 | A1* | 11/2016 | Liu | G01C 21/3438 |
| 2017/0280304 | A1* | 9/2017 | Okada | H04W 8/186 |
| 2017/0330111 | A1* | 11/2017 | Vogel | G06N 5/04 |
| 2018/0266835 | A1* | 9/2018 | Shimota | G01C 21/362 |
| 2018/0367957 | A1* | 12/2018 | Fujimoto | H04W 4/06 |
| 2019/0283763 | A1* | 9/2019 | Wang | G07C 5/08 |
| 2019/0369828 | A1* | 12/2019 | Kitahashi | G06F 3/0487 |
| 2020/0012996 | A1* | 1/2020 | Sugiyama | G01C 21/3438 |

FOREIGN PATENT DOCUMENTS

| | | |
|---|---|---|
| JP | 2008-242521 A | 10/2008 |
| JP | 2016-173783 A | 9/2016 |

OTHER PUBLICATIONS

Personalized_Context_Based_Services_for_Dynamic_User_Groups (Year: 2009).*
On_demand_routing_scheme_for_real-spatial_information_based_group_communication (Year: 2015).*
In-Vehicle_Infotainment_Management_System_in_Internet-of-Things_Networks (Year: 2019).*
English Translation of Office Action dated Jul. 25, 2022 in Chinese Application No. 202110369995.9.

* cited by examiner

Fig. 1
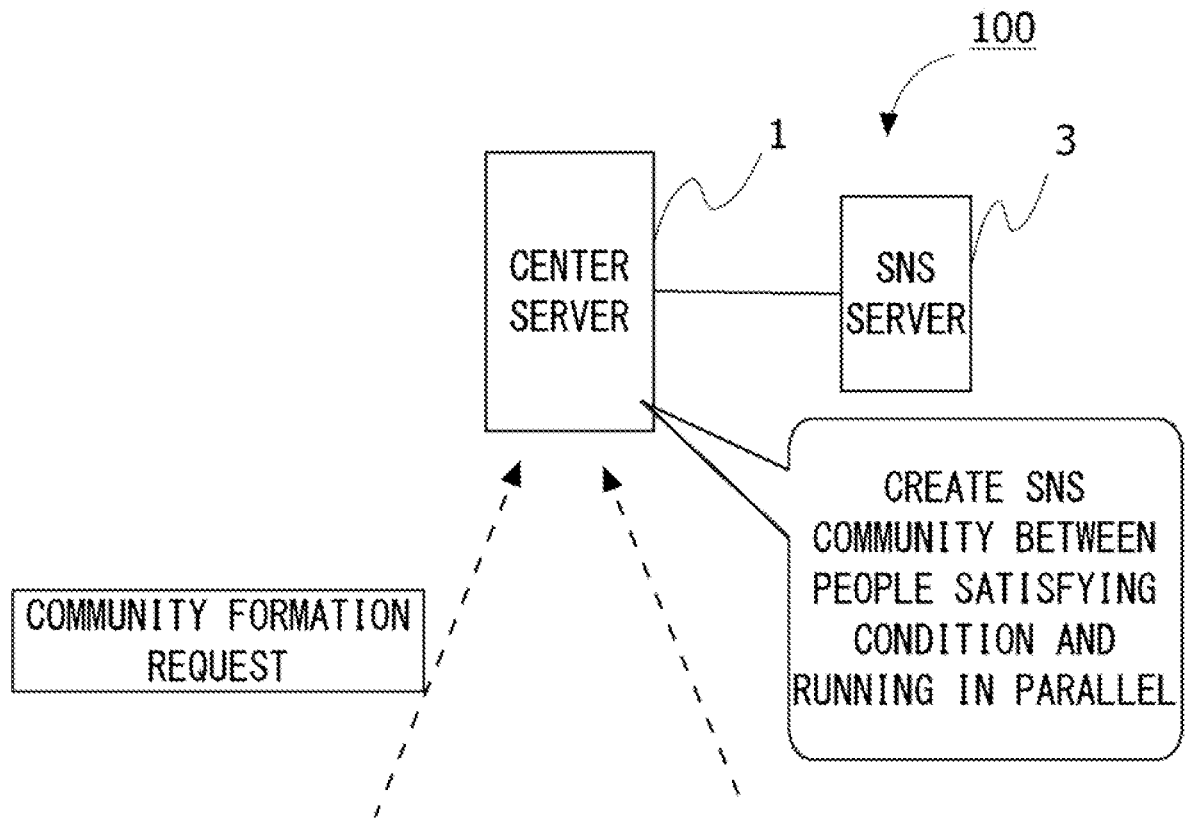
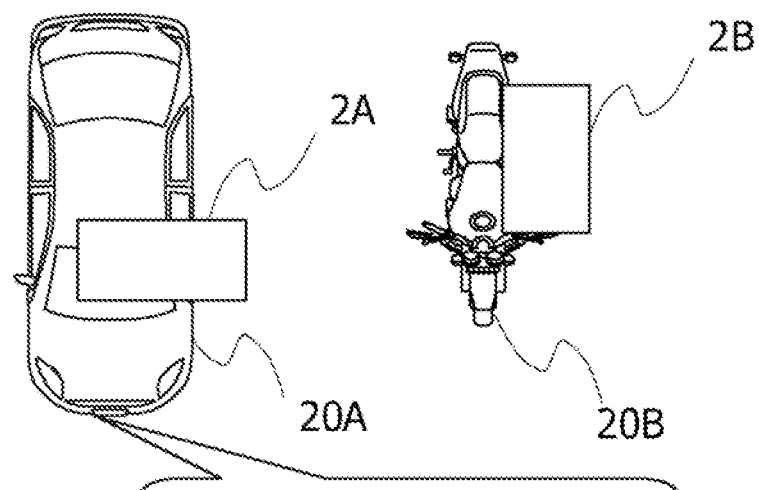

Fig. 5

PARALLEL RUNNING STATE MONITORING TABLE

| USER ID | INITIAL TIME STAMP | LATEST TIME STAMP | PARALLEL RUNNING DURATION |
|---|---|---|---|
| | | | |
| | | | |
| | | | |
| | | | |
| | | | |

FIG. 6

USER INFORMATION TABLE

| USER ID | CONTACT INFORMATION | ACCOUNT NAME | ATTRIBUTE INFORMATION | | | | PREFERENCE INFORMATION | |
|---|---|---|---|---|---|---|---|---|
| | | | GENDER | AGE | RESIDENT AREA | VEHICLE | HOBBY #1 | HOBBY #2 |
| U001 | | AC01 | MALE | TWENTIES | A PREFECTURE | CAR TYPE | DRIVING | TRAVEL |
| U002 | | AC02 | MALE | THIRTIES | B PREFECTURE | MOTORCYCLE TYPE | TOURING | GAME |
| U003 | | AC03 | MALE | TWENTIES | C PREFECTURE | CAR TYPE | TRAVEL | EATING FINE FOOD |
| U004 | | AC04 | FEMALE | THIRTIES | D PREFECTURE | CAR TYPE | MUSIC APPRECIATION | DRIVING |
| U005 | | AC05 | MALE | FORTIES | E PREFECTURE | MOTORCYCLE TYPE | TOURING | EATING FINE FOOD |

Fig. 7

MEMBER ATTRIBUTE DESIRED
CONDITION INFORMATION TABLE

| USER ID | GENDER | AGE | RESIDENT AREA | VEHICLE |
|---|---|---|---|---|
| U001 | UN MENTIONED | TWENTIES | X1 AREA | AUTOMOBILE |
| U002 | MALE | THIRTIES | X2 AREA | MOTORCYCLE |
| U003 | UN MENTIONED | UN MENTIONED | UN MENTIONED | UN MENTIONED |
| U004 | FEMALE | UN MENTIONED | UN MENTIONED | CAR TYPE |
| U005 | UN MENTIONED | FORTIES | X5 AREA | UN MENTIONED |

INFORMATION PROCESSING APPARATUS, INFORMATION PROCESSING SYSTEM, AND NON-TEMPORARY STORAGE MEDIUM

CROSS REFERENCE TO THE RELATED APPLICATION

This application claims the benefit of Japanese Patent Application No. 2020-069709, filed on Apr. 8, 2020, which is hereby incorporated by reference herein in its entirety.

BACKGROUND

Technical Field

The present disclosure relates to an information processing apparatus, an information processing system, and non-temporary storage medium.

Description of the Related Art

A service for recommending a user a community with an attribute that matches a profile of a user is disclosed (for example, Japanese Patent Laid-Open No. 2008-242521).

CITATION LIST

Patent Document

[Patent Document 1] Japanese Patent Laid-Open No. 2008-242521

SUMMARY

One or more aspects of the present disclosure are directed to provide an information processing apparatus and an information processing system capable of creating a communication group with surrounding users during movement.

One aspect of the present disclosure may be an information processing apparatus including a controller including at least one processor configured to:

detect at least one second user terminal that exists in a predetermined range from a moving first user terminal and is moving in the same direction as the first user terminal;

create a first communication group including respective users of the first user terminal and the second user terminal as members; and notify the first user terminal and the second user terminal that the first communication group is created.

Another aspect of the present disclosure may be an information processing apparatus including a controller including at least one processor configured to:

detect at least one second user terminal that exists in a predetermined range from a first user terminal of a self-device during movement and is moving in the same direction as the first user terminal;

transmit a group creation request requesting creation of a communication group including respective users of the first user terminal and the second user terminal as members, to a predetermined server;

receive a notification that the communication group is created as a response to the group creation request, from the predetermined server; and notify the user of the first user terminal that the communication group is created.

Another aspect of the present disclosure may be an information processing system including:

a server including a first controller, the first controller including at least one processor configured to:

receive a group creation request requesting creation of a communication group with at least one second user terminal that exists in a predetermined range from the first user terminal and is moving in the same direction as the first user terminal, from a moving first user terminal;

create a communication group including respective users of the first user terminal and the second user terminal as members; and notify the first user terminal and the second user terminal that the communication group is created; and a user terminal including a second controller, the second controller including at least one processor configured to:

detect the second user terminal during movement;

transmit the group creation request to the server;

receive a notification that the communication group is created from the server; and notify the user of the first user terminal that the communication group is created.

According to the present disclosure, it is possible to create a communication group with surrounding users during movement.

BRIEF DESCRIPTION OF THE DRAWINGS

FIG. 1 is a diagram illustrating an example of a system configuration of a group automatic creation system according to a first embodiment;

FIG. 5 illustrates an example of a parallel running state monitoring table of the onboard device;

FIG. 6 illustrates an example of a user information table;

FIG. 7 illustrates an example of a member attribute desired condition information table;

DESCRIPTION OF THE EMBODIMENTS

Figure 2:
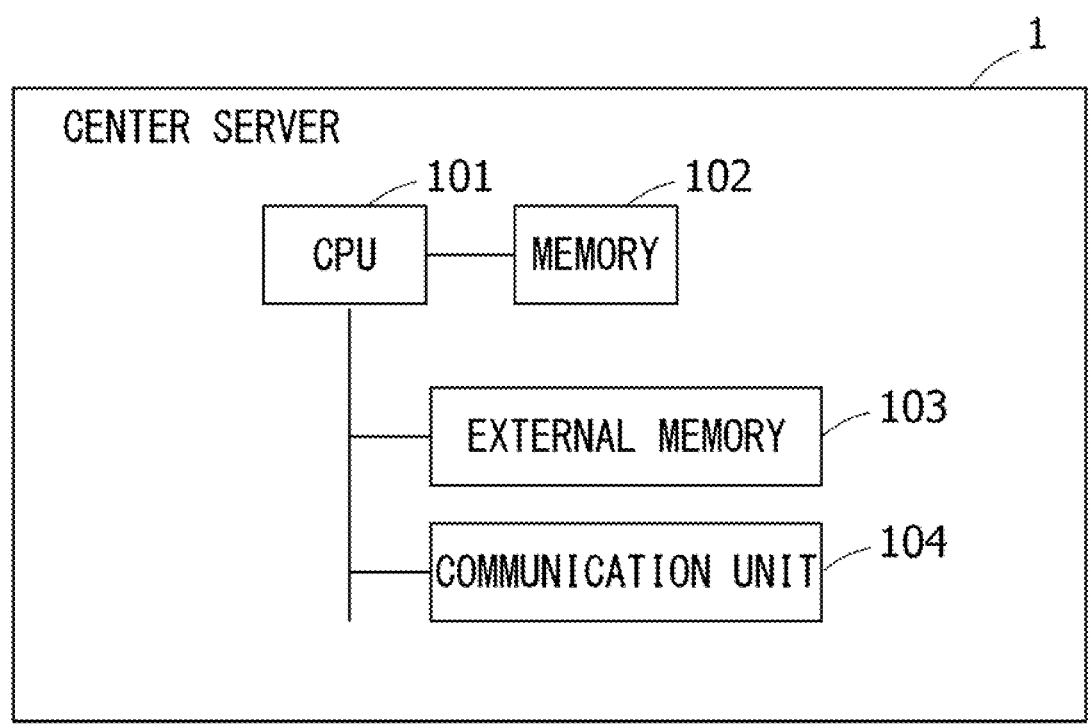
FIG. 2 illustrates an example of hardware components of a center server.

For example, in a case of touring by a motorcycle, driving alone, or traveling alone by public transportation, it is one of pleasures to interact with a person he/she meets on a spot at a resting place or a destination. However, many people find it difficult to call out to strangers. Therefore, in the present disclosure, for example, a communication group is created between users who are moving in the same direction, such as users who are running in parallel on motorcycles or automobiles, and users who are riding on the same train, so that interaction between the users is promoted.

Specifically, an aspect of the present disclosure may be an information processing apparatus including a controller. The information processing apparatus is, for example, a server. The controller may be a processor such as a control processing unit (CPU). The controller may detect at least one second user terminal that exists in a predetermined range from a moving first user terminal and is moving in the same direction as the first user terminal. The controller may create a first communication group including respective users of the first user terminal and the second user terminal as members. Then the controller may notify the first user terminal and the second user terminal that the first communication group is created.

The user terminal is, for example, an onboard device mounted on a vehicle, a smartphone, a tablet terminal, or a portable PC (Personal Computer). The vehicle mounted with the onboard device is, for example, an automobile, a two-wheeled vehicle, or the like.

According to an aspect of the present disclosure, the first user terminal and the second user terminal may move in the same direction within the predetermined range, so that the communication group including the respective users of the first user terminal and the second user terminal as members is created. Consequently, for example, assuming that both the first user terminal and the second user terminal are onboard devices, when the users of the first user terminal and the second user terminal arrive at the same destination, the users can promote interaction with the creation of the communication group as a trigger.

In an aspect of the present disclosure, the controller may transmit a message suggesting a place where the respective users of the first user terminal and the second user terminal meet, to the first user terminal and the second user terminal. Consequently, it is possible to further lubricate the joining between the respective users of the first, user terminal and the second user terminal.

In one aspect of the present disclosure, the information processing apparatus may further include a storage configured to store user information related to a user, and a first condition related to a user attribute desired to a member of a communication group by the user. The controller may determine for the users of the first user terminal and the second user terminal, whether or not attribute of the user of the first user terminal satisfy first condition of the second user and attribute of the user of the second user terminal satisfy first condition of the first user.

In a case where the respective attributes satisfy the respective first conditions, the controller may create the first communication group. In a case where the respective attributes do not satisfy the respective first conditions, the controller may not create the first communication group. Examples of the type of the user attribute include gender, age, a resident area, and an associated models of vehicles. Consequently, it is possible to create the first communication group with the user having the attribute that the user desires, and it is possible to more actively interact.

In an aspect of the present disclosure, the user information may include preference information related to preference of a user. In this case, the controller may determine whether or not at least one part of the respective pieces of preference information of the users of the first user terminal and the second user terminal is common. In a case where at least one part of the respective pieces of preference information is common, the controller may create the first communication group. In a case where there is no common part in the respective pieces of preference information, the controller may not create the first, communication group. Consequently, a communication group may be created between users whose at least one of the pieces of preference information is common, and therefore the users can have a common topic and promote interaction.

In an aspect of the present disclosure, the controller may acquire information related to a movement destination from each of the first, user terminal and the second user terminal, and may determine whether or not the respective movement destinations of the first user terminal and the second user terminal are in the same direction. In a case where the movement destinations are in the same direction, the controller may create the first communication group. In a case where the movement destinations are not in the same direction, or the information related to the movement destination is not acquired from at least one of the first user terminal and the second user terminal, the controller may not create the first communication group. Consequently, it is possible to suppress creation of an extra communication group.

In an aspect of the present disclosure, the controller may determine whether or not the respective users of the first user terminal and the second user terminal already belong to the same communication group. In a case where the respective users of the first user terminal and the second user terminal do not belong to the same communication group, the controller may create the first communication group. In a case where the respective users of the first user terminal and the second user terminal already belong to the same communication group, the controller may not create the first communication group. Consequently, it is possible to suppress creation of an extra communication group.

In an aspect of the present disclosure, the controller may transmit a permission request requesting permission to create the first communication group to each of the first user terminal and the second user terminal. In a case where a permission response indicating the permission to create the first communication group is received from each of the first user terminal and the second user terminal, the controller may create the first communication group. In a case where the permission, response is not received from at least one of the first user terminal and the second user terminal, the controller may not create the first communication group. Consequently, it is possible to suppress creation of an extra communication group.

Another aspect of the present disclosure may be an information processing apparatus including a controller. The information processing apparatus may be also a first user terminal. A controller may detect at least one second user terminal that exists in a predetermined range from a first user terminal of a self-device during movement and is moving in the same direction as the first user terminal. The controller may transmit a group creation request requesting creation of a communication group including respective users of the first user terminal and the second user terminal as members, to a predetermined server. The controller may receive a notification that the communication group is created as a response to the group creation request from the predetermined server, and notifies the user of the first user terminal that the communication group is created.

In another aspect of the present disclosure, the controller may receive a first signal transmitted in a predetermined cycle from the second user terminal by a communication method not using a relay device, and may measure duration of continuous reception of the first signal from the second user terminal. In a case where the duration is the predetermined time or more, the controller may transmit the group creation request to the predetermined server. The first signal may be transmitted in a predetermined cycle by multicast. Consequently, the user terminal that, may receive and process the first signal can be limited to a user terminal that can receive the multicast. The user terminal capable of receiving the multicast is, for example, a user terminal registered in a service for creating a communication group between users moving in the same direction.

In an aspect of the present disclosure, the controller may transmit identification information of the user of the first user terminal together with the first signal. The controller may determine which user terminal transmits the group creation request to the predetermined server, on the basis of identification information of the identification information of the user of the first user terminal and identification information of the user of the second user terminal received from the second user terminal together with the first signal. Similarly, the second user terminal may also determine which user terminal transmits the group creation request to the predetermined server, on the basis of the identification information of the user of the second user terminal and the identification information of the user of the first user terminal received from the first user terminal together with the first signal. The first user terminal and the second user terminal may make the determination using the same determination criteria. Consequently, it is possible to suppress duplicate transmission of the group creation requests to the predetermined server by the first user terminal and the second user terminal.

As another aspect of the present disclosure, a system including the above information processing apparatus and a user terminal can be mentioned.

Hereinafter, embodiments of the present disclosure will be described with reference to the drawings. The configurations of the following embodiments are examples, and the present disclosure is not limited to the configurations of the embodiments.

First Embodiments

FIG. 1 is a diagram illustrating an example of a system configuration of a group automatic creation system 100 according to a first embodiment. The group automatic creation system 100 is a system that automatically creates a communication group including, as a member, a user associated with each of two vehicles that run in parallel in a case where a predetermined condition is satisfied. The communication group is a group used within a predetermined social networking service (SNS). Users included in the group are called members.

The group automatic creation system 100 includes a center server 1, and a plurality of onboard devices 2 mounted on vehicles 20. For convenience, in FIG. 1, an onboard device 2A mounted on a vehicle 20A and an onboard device 2B mounted on a vehicle 20B are illustrated. The vehicle 20A is an automobile. The vehicle 20B is a two-wheeled vehicle. In a case where the vehicle 20A and the vehicle 20B, and the onboard device 2A and the onboard device 2B are not distinguished, the vehicle 20A and the vehicle 20B, and the onboard device 2A and the onboard device 2B are referred to as the vehicles 20 and the onboard devices 2, respectively.

Each onboard device 2 is an onboard device associated with a user who registers to receive a service provided by the group automatic creation system 100. The user is, for example, an occupant or an owner of each vehicle 20. The occupant of the vehicle includes a driver. Hereinafter, the service provided by the group automatic creation system 100 will be referred to as a group automatic creation service.

A client application for receiving the group automatic creation service, and a predetermined SNS application are installed in each onboard device 2. Further, in the first embodiment, each onboard device 2 includes a vehicle-to-vehicle communication function.

In FIG. 1, the vehicle 20A and the vehicle 20B are running in the same direction on a highway, a main road, a mountain road, or the like, side by side on the left and right or front and back in a row. A state in which a plurality of the vehicles 20 are running in the same direction side by side on the left and right or front and back in a row is hereinafter referred to as a parallel running state. The onboard device 2A and the onboard device 2B each transmit a member recruitment signal for indicating its own existence to the onboard device 2 associated with other user registered in the group automatic creation service at a predetermined interval. The member recruitment signal is transmitted, for example, to a multicast address used for the group automatic creation service. The transmission interval of the member recruitment signal is set to, for example, 0.1 to 3 seconds. The member recruitment signal is transmitted, for example, by vehicle-to-vehicle communication. Along with the member recruitment signal, user identification information of the user associated with the onboard device 2 of a source is also transmitted. The user identification information is, for example, identification information assigned to each user in the group automatic creation system 100. The member recruitment signal is an example of a "first signal".

The onboard device 2A detects that the vehicle 20A and the vehicle 20B mounted with the onboard device 2B are in a parallel running state in a case where the onboard device 2A continuously receives a member recruitment signal transmitted from the onboard device 2B for a predetermined time. In this case, the onboard device 2A transmits a group creation request requesting creation of a communication group including, as members, a user A associated with the onboard device 2A, and an occupant of the vehicle 20B running in parallel with the vehicle 20A, that is, a user B associated with the onboard device 2B, to the center server 1. Hereinafter, the communication group will be simply referred to as a group. Along with the group creation request, position information of the vehicle 20A, user identification information of the user A associated with the onboard device 2A of the source, and user identification information of the user B received from the onboard device 2B together with a member recruitment signal are also transmitted to the center server 1.

The onboard device 2B also receives a member recruitment signal from the onboard device 2A, and detects that the vehicle 20B and the vehicle 20A mounted with the onboard device 2A are in a parallel running state. However, when the onboard device 2B also transmits a member recruitment signal, a group creation request requesting the creation of a group including the same member arrives at the center server 1 in duplicate. Therefore, in the first embodiment, for example, parent-child relationship between the onboard device 2A and the onboard device 2B is determined on the basis of the user identification information, and the onboard device 2A corresponding to a parent transmits the group creation request to the center server 1.

When the center server 1 receives the group creation request from the onboard device 2A, the center server 1 determines whether or not the user A and the user B satisfy predetermined conditions on the basis of the user identification information of the user A and the user B received together with the group creation request. The predetermined conditions include that mutual pieces of attribute information match mutual member attribute desired conditions each indicating desire to an attribute of a member, that at least one of mutual pieces of preference information is common, the direction of the destinations are the same, and that the user A and the user B do not already belong to the same group.

In a case where the user A and the user B satisfy the predetermined conditions, the center server 1 creates a group including the user A and the user B as members, and registers the group in an SNS server 3. In addition, the center server 1 notifies the onboard device 2A and the onboard device 2B that a new group including the user A and the user B as members is created. Along with the notification, the center server 1 also transmits a message for guiding the vehicle 20A and the vehicle 20B from the positions of the vehicle 20A and the vehicle 20B to a junction point such as a resting place or a parking lot located in the direction of the destination.

The onboard device 2A and the onboard device 2B each output the notification that the new group including the user A and the user B as members is created, and a guidance message to the junction point on the display. In a case where the user A of the vehicle 20A and the user B of the vehicle 20B recognize the above, and arrive at the junction place, the user A and the user B recognize each other, so that a trigger for allowing the user A and the user B to interact with each other can be created.

For convenience of explanation, the vehicle 20A and the onboard device 2A will be described as an ego vehicle 20A and an ego onboard device 2A, respectively, as the center of a process related to the vehicle 20. Therefore, in a case where the vehicle 20 and the onboard device 2 itself are indicated, the vehicle 20 and the onboard device 2 are expressed as the ego vehicle 20A and the ego onboard device 2A. Further, the vehicle 20B and the onboard device 2B will be described as the other vehicle 20B and the other onboard device 2B with respect to the ego vehicle 20A and the onboard device 2A, respectively. However, the other vehicle with respect to the vehicle 20A and the onboard device 2A is not limited to the vehicle 20B. The ego vehicle is not limited to the vehicle 20A and the onboard device 2A.

FIG. 2 is an example of hardware components of the center server 1. The center server 3 includes a CPU 101, a memory 102, an external memory 103, and a communication unit 104 as hardware components. The memory 102 and the external memory 103 are computer-readable recording media. The center server 1 is an example of an "information processing apparatus", a "predetermined server", and a "server".

The external memory 103 stores various programs and data used by the CPU 101 when each program is executed. The external memory 103 is, for example, an erasable programmable ROM (EPROM) or a hard disk drive (Hard Disk Drive). The programs held in the external memory 103 hold, for example, an operating system (OS), a control program of the group automatic creation system, and various other application programs.

The memory 102 is a main memory that provides the CPU 101 with a storage area and a work area for loading a program stored in the external memory 103, or is used as a buffer. The memory 102 includes, for example, a semiconductor memory such as a read only memory (ROM) and a random access memory (RAM).

The CPU 101 executes various processes by loading the OS and the various application programs held in the external memory 103 into the memory 102 and executing the OS and the various application programs. The number of the CPUs 101 is not limited to one, and a plurality of the CPUs 101 may be provided. The CPU 101 is an example of a "controller" or a "first controller" of an "information processing apparatus".

The communication unit 104 is, for example, a wired network card such as a local area network (LAN) and a dedicated line, and performs connection to a public network such as the Internet through an access network such as the LAN. The hardware components of the center server 1 are not limited to those illustrated in FIG. 2.

Figure 3:
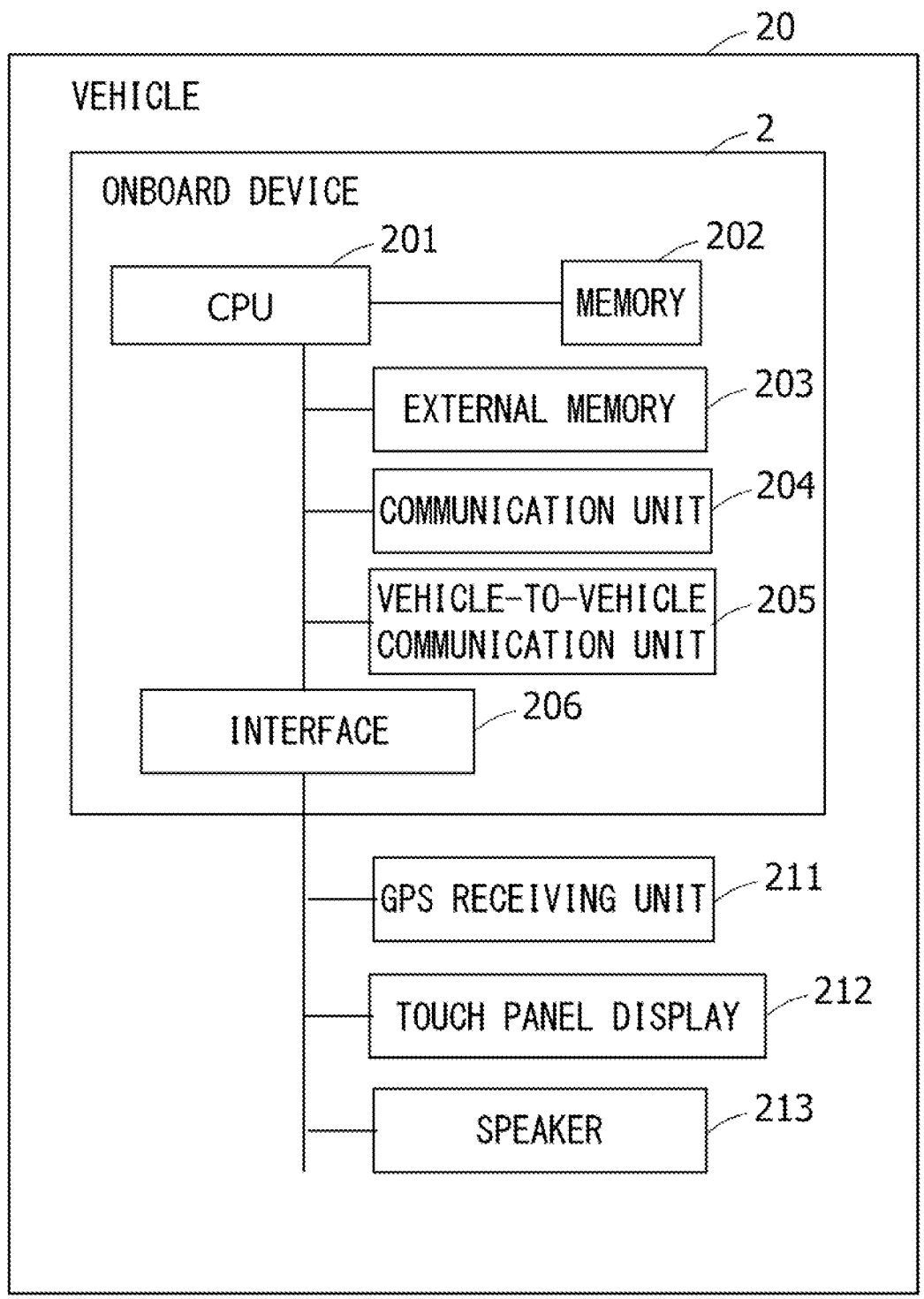
FIG. 3 is a diagram illustrating an example of hardware components of a vehicle and an onboard device.

FIG. 3 is a diagram illustrating an example of hardware components of the vehicle 20 and the onboard device 2. In FIG. 3, the hardware components used for the group automatic creation service are extracted and illustrated from hardware components of the vehicle 20. The vehicle 20 includes the onboard device 2, a global positioning system (GPS) receiving unit 211, a touch panel display 212, and a speaker 213 as the hardware components used for the group automatic creation service.

The GPS receiving unit 211 receives radio waves of time signals from a plurality of artificial satellites (Global Positioning Satellites) orbiting the earth, and calculates, for example, the latitude and the longitude as position information of the vehicles 20 from the detected signals.

The touch panel display 212 displays, for example, a notification from the center server 1. The speaker 213 outputs, for example, a notification from the center server 1 by voice.

Each onboard device 2 includes a CPU 203, a memory 202, an external memory 203, a communication unit 204, a vehicle-to-vehicle communication unit 205, and an interface 206 as hardware components. The memory 202 and the external memory 203 are computer-readable recording media. The onboard device 2 is an example of an "information processing apparatus" and a "user terminal".

The CPU 201, the memory 202, and the external memory 203 are the same as the CPU 101, the memory 102, and the external memory 203, respectively. The external memory 203 holds, for example, an operating system (OS), a client program of the group automatic creation service, a predetermined SNS application, and various other application programs. The CPU 201 is an example of a "controller" of an "information processing apparatus" corresponding to a user terminal. Further, the CPU 201 is an example of a "second controller" of a "user terminal".

The communication unit 204 is an interface that inputs and outputs information to and from the network. The communication unit 204 is an interface that performs connection to a wireless network. The communication unit 204 performs communication based on a mobile communication method such as 5th generation (5G), long term evolution (LTE), and 3rd generation (3G), or a wireless communication standard such as Wi-Fi (registered trademark).

The vehicle-to-vehicle communication unit 205 directly communicates with the other vehicle 20B. The direct communication indicates communication not using a relay device. The vehicle-to-vehicle communication unit 205 communicates according to a wireless communication method for vehicle-to-vehicle communication such as dedicated short range communications (DSRC).

The interface 206 connects the hardware components other than the onboard device 2 in the vehicle 20 to the onboard device 2. The GPS receiving unit 211, the touch panel display 212, the speaker 213, and the like are connected to the interface 206. The hardware components of the vehicle 20 are not limited to those illustrated in FIG. 3.

Figure 4:
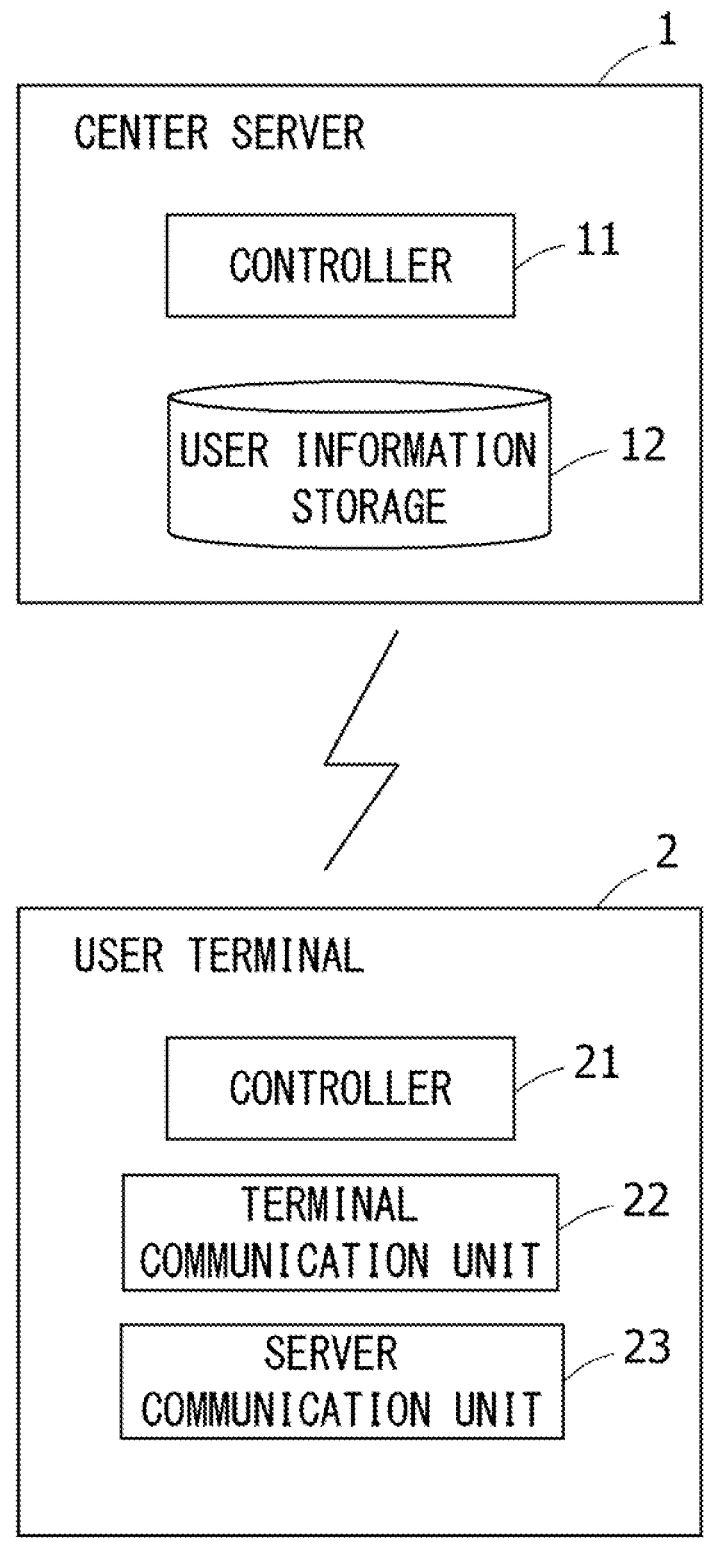
FIG. 4 is a diagram illustrating an example of functional components of the center server and the onboard device.

FIG. 4 is a diagram illustrating an example of functional components of the center server 1 and the onboard device 2. The onboard device 2 includes a controller 21, a terminal communication unit 22, and a server communication unit 23 as the functional components. These functional components are, for example, functional components achieved by executing the client program of the group automatic creation service by the CPU 201 of the onboard device 2. The onboard devices 2 included in the group automatic creation system 100 include the same functional components, but for convenience, the ego onboard device 2A will be described on behalf of the onboard devices 2.

The terminal communication unit 22 is an interface with the vehicle-to-vehicle communication unit 205. The terminal communication unit 22 can be said to be an interface with the other onboard device 28. The terminal communication unit 22 outputs information input from the controller 21 to the vehicle-to-vehicle communication unit 205. The terminal communication unit 22 outputs the information input from the vehicle-to-vehicle communication unit 205 to the controller 21.

The server communication unit 23 is an interface with the communication unit 104. The server communication unit 23 can be said to be an interface with a server on the network. The server communication unit 23 outputs the information input from the controller 21 to the communication unit 104. The server communication unit 25 outputs information input from the communication unit 104 to the controller 21.

The controller 21 detects the other vehicle 20B in a parallel running state, and controls a process of transmitting a group creation request to the center server 1. The controller 21 transmits a member recruitment signal and user identification information through the terminal communication unit 22, for example, by multicast. Further, the controller 21 receives a member recruitment signal and user identification information transmitted from the other onboard device 2B through the terminal communication unit 22, and monitors the member recruitment signal received from the other onboard device 2B.

In a case where the controller 21 detects that the member recruitment signal is continuously received from the other onboard device 2B for a predetermined time or more, the controller 21 determines whether or not to transmit a group creation request to the center server 1. The predetermined time is set, for example, in a range of 10 minutes to 60 minutes. Along with the group creation request, position information, user identification information associated with the ego onboard device 2A as user identification information of a user of a group member candidate, and user identification information received together with the member recruitment signal are also transmitted. Detecting that the member recruitment signal is continuously received from the other onboard device 2B for a predetermined time or more is, for example, an example of "detect at least one second user terminal that exists in a predetermined range from a moving first user terminal and is moving in the same direction as the first, user terminal". The "predetermined range" is, for example, a reachable range of radio waves for vehicle-to-vehicle communication. Hereinafter, the user associated with the ego onboard device 2A will be referred to as the user A, and the user associated with the other vehicle will be referred to as the user B.

For example, in a case where the controller 21 determines parent-child relationship on the basis of the user identification information of the user A associated with the ego onboard device 2A and the user identification information of the user B received from the other onboard device 2B, and when the ego onboard device 2A becomes a parent, the controller 21 transmits a group creation request to the center server 1 through the server communication unit 23. The parent-child relationship between the ego onboard device 2A and the other onboard device 2B is determined, for example, by whether the user identification information is large or small.

As a response to the group creation request, the controller 21 receives a group creation success response or a group creation failure response from the center server 1 through the server communication unit 23. The group creation success response indicates that a group including, as members, the user A and the user B of the group member candidates transmitted together with the group creation request is created. The group creation failure response indicates that a group including, as members, the user A and the user B of the group member candidates transmitted together with the group creation request is not created.

In a case where the group creation success response is received, the controller 11 indicates on the touch panel display 212 that a new group including the user B of the other vehicle 20B in the parallel running state is created, and notifies the user A of the ego vehicle 20A of the above. In a case where a guidance message to a junction place with the user who becomes a member is received together with the group creation success response, the guidance message is also displayed on the touch panel display 212.

FIG. 5 is an example of a parallel running state monitoring table of the ego onboard device 2A. The parallel running state monitoring table is a table for monitoring the duration of reception of a member recruitment signal from the other onboard device 28. The parallel running state monitoring table is stored in, for example, a storage area of the memory 202 of the ego onboard device 2A. The parallel running state monitoring table illustrated in FIG. 5 includes fields for user ID, initial time stamp, latest time stamp, and parallel running duration.

In the user ID field, user identification information of the user B received together with a member recruitment signal from the other vehicle 20B is stored. In the first time stamp field, for example, the date and time when a member recruitment signal is first received in the ego vehicle 20A is stored. In the latest time stamp field, for example, the date and time when a member recruitment signal is last received in the ego vehicle 20A is stored. As the time stamp, time stamp given to the member recruitment signal by the other vehicle 20B which is a source may be used.

The parallel running duration field stores a value obtained by subtracting a value of the first time stamp field from a value of the latest time stamp field, that is, duration of reception of the member recruitment signal from the other onboard device 2B. The duration of reception of the member recruitment signal from the other onboard device 2B indicates duration of the parallel running state of the ego vehicle 20A and the other vehicle 20B.

In a case where the user identification information of the user B received together with the member recruitment signal is not registered in the parallel running state monitoring table when the controller 21 receives the member recruitment signal from the other onboard device 2B, the controller 21 creates an entry corresponding to the user identification information of the user B. In addition, the controller 21 stores a value of initial time stamp of the newly created entry.

In a case where the user identification information of the user B received together with the member recruitment signal is already registered in the parallel running state monitoring table, the controller 11 updates the values of the fields of the latest time stamp and the parallel running duration of the entry. Further, in a case where the controller 11 does not receive the member recruitment signal with the user identification information of the user B indicated by the value of the user ID field of the entry even after a predetermined time is elapsed from the time indicated by the latest time stamp field, the entry is deleted. The information included in the parallel running state monitoring table is not limited to the example illustrated in FIG. 5.

Returning to FIG. 4, the center server 1 includes the controller 11 and a user information storage 12 as functional components. These functional components are, for example, functional components achieved by executing the control program of the group automatic creation system by the CPU 101 of the center server 1.

The controller 11 receives a group creation request from the ego onboard device 2A. Along with the group creation request, for example, position information of the ego onboard device 2A and user identification information of two users (the user A and the user B) of member candidates are also received. Upon receiving the group creation request from the ego onboard device 2A, the controller 11 determines whether or not the following conditions (1) to (4) are satisfied for the two users of the member candidates.

(1) The pieces of attribute information of the two users should match respective member attribute desired conditions indicating desire to an attribute of a member. The attribute information of each user and the member attribute desired conditions are acquired from the user information storage 12 described later.

(2) At least one of pieces of preference information should be common between the two users. The preference information of each user is obtained from the user information storage 12 described later.

(3) The directions of the destinations of the two users should be the same. For example, the controller 11 acquires the destination information of the user by transmitting a destination acquisition request to each of the ego onboard device 2A and the other onboard device 2B. The onboard device 2 transmits the destination to the center server as a response in a case where the destination is set in, for example, a car navigation system. In a case where the destination is not set in the car navigation system, or in a case where the vehicle 20 is not mounted with a device including a car navigation system, the destination information is not acquired.

(4) The two users should not already belong to the same group. Information indicating whether or not the two users belong to the same group is acquired, for example, by inquiring to the SNS server 3. This is because in a case where the two users already belong to the same group, there is a high possibility that, the two users are acquainted with each other, and it is not necessary to create a new group for acquaintance.

In a case where all of the above conditions (1) to (4) are satisfied, the controller 11 creates a group including the two users as members and registers the group in the SNS server 3. Further, the controller 11 transmits a group creation success response indicating creation of a group including, as a member, the user indicated by the user identification information received together with the group creation request, to the ego onboard device 2A corresponding to the user A who is a member of the group. The group creation success response is also transmitted to the other onboard device 2B associated with the user B who is a member of the group, which is not a source of the group creation request. Further, the controller 11 sets a resting place or a parking lot located in the direction of the destination from a position indicated by position information of the ego onboard device 2A received together with the group creation request, for a junction point, and transmits a guidance message to the junction point to each of the ego onboard device 2A and the other onboard device 2B.

When the other onboard device 2B receives the group creation success response, the touch panel display 212 indicates that a group of the user B and the user A of the ego vehicle 20A running in parallel with the other vehicle 20B is created.

In a case where at least one of the above conditions (1) to (4) is not satisfied, the controller 11 determines that the group including the two users as members is not generated, and transmits a group creation failure response to the ego onboard device 2A of the source of the group creation request. The conditions under which the group is created are not limited to the above (1) to (4).

The user information storage 12 is created in a storage area of the external memory 103 of the center server 1. The user information storage 12 is a database that stores information about users.

FIG. 6 is an example of a user information table. The user information table is a table that holds information related to users. The user information table is stored in the user information storage 12.

The user information table illustrated in FIG. 6 includes fields for user ID, contact information, an account name, attribute information, and preference information. The user identification information assigned in the group automatic creation system 100 is stored in the user ID field. In the contact field, contact information of the onboard device 2 associated with a user indicated by a value of the user ID field is stored. The contact information of the onboard device 2 is, for example, an IP address of the onboard device 2, an e-mail address, or the like. However, the contact information is not limited to this. In the account name field, the account name of a predetermined SNS of a user indicated by a value of the user ID field is stored.

The attribute information field includes subfields for gender, age, a resident area, and a vehicle. Respective pieces of information corresponding to the field names are stored in the subfields for gender, age, and a resident area. The resident area may be, for example, a prefecture name or a local name. The type of the vehicle 20 is stored in the vehicle subfield. Depending on the type of the vehicle, for example, in the case of an automobile, information such as a vehicle name, a vehicle shape, and a model is indicated.

The preference information field includes subfields of hobby #1, hobby #2, . . . . In the hobby subfield, words indicating the genre of the hobby are stored.

FIG. 7 is an example of a member attribute desired condition information table. The member attribute desired condition information table is a table that stores the member attribute desired condition indicating desire to an attribute of a member. The member attribute desired condition information table is stored in the user information storage 12. The member attribute desired condition is an example of a "first condition".

The member attribute desired condition information table illustrated in FIG. 7 includes fields for user ID, gender, age, a resident area, and a vehicle. The fields for gender, age, a resident area, and a vehicle are provided corresponding to the subfields of attribute information in the user information table illustrated in FIG. 6.

The gender, age, resident area, and vehicle fields store values indicating attributes to a user who is a member of a group, the attribute being desired by a user indicated by a value in the user ID field. In a case where the values of these fields are not particularly designated by a user, values indicating "unmentioned" are stored. In addition, a user may designate "unmentioned" as the values of these fields.

The information stored in the user information table and the member attribute desired information table is set, for example, when the user is registered in the group automatic creation service. In addition, the value of each field can be changed according to a request from the user. The information stored in the user information table is not limited to that illustrated in FIG. 6. The information stored in the member attribute desired condition information table is not limited to that illustrated in FIG. 7.

<Processing Flow>

Figure 8:
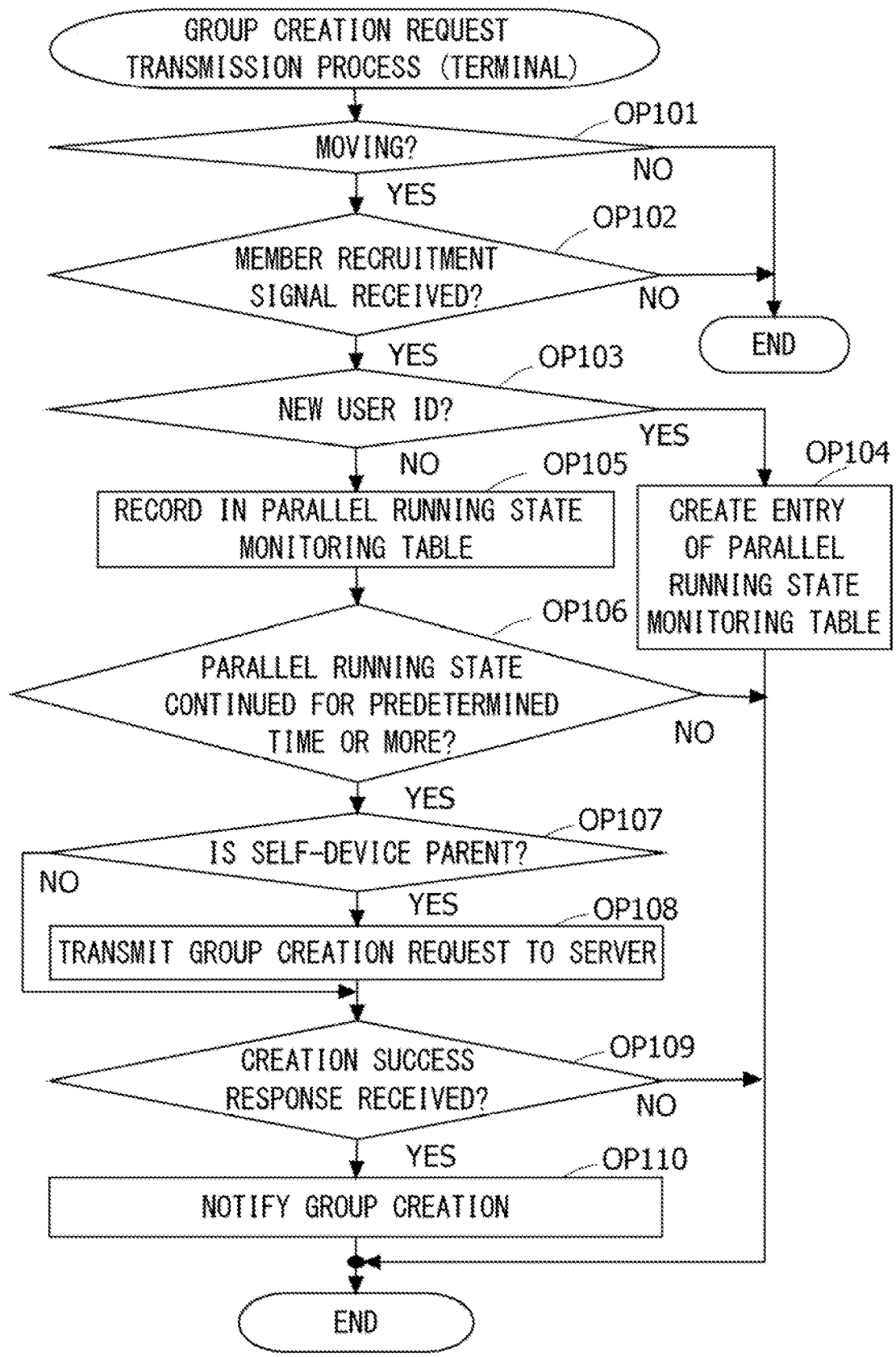
FIG. 8 illustrates an example of a flowchart of a transmission process of a group creation request of the onboard device.

FIG. 8 is an example of a flowchart of a transmission process of the group creation request of the onboard device 2. The process illustrated in FIG. 8 is executed in a predetermined cycle, for example, during start-up of the onboard device 2. An execution subject of the process illustrated in FIG. 8 is the CPU 201 of the onboard device 2, but for convenience, the functional components will be mainly described. The same applies to the following flowchart. In FIG. 8, the onboard device 2 that is a main body of the process is defined as the ego onboard device 2A.

In OP101, the controller 21 determines whether or not the ego onboard device 2A is moving. Whether or not the ego onboard device 2A is moving is detected on the basis of, for example, change in position information or a detection value of a sensor such as an acceleration sensor provided in the ego vehicle 20A. In a case where the ego onboard device 2A is moving (OP101: YES), the process proceeds to OP102. In a case where the ego onboard device 2A is not moving (OP101: NO), the process illustrated in FIG. 8 ends.

In OP102, the controller 21 determines whether or not a member recruitment signal transmitted from the other onboard device 28 is received through the terminal communication unit 22. In a case where the member recruitment signal from the other onboard device 2B is received (OP102: YES), the process proceeds to OP103. In a case where the member recruitment signal from the other onboard device 2B is not received (OP102: NO), the process illustrated in FIG. 8 ends.

In OP103, the controller 21 determines whether or not user identification information of the user B received together with the member recruitment signal is new user identification information. That is, the controller 21 determines whether or not the user identification information of the user B received together with the member recruitment signal is registered in the parallel running state monitoring table. In a case where the user identification information of the user 3 received together with the member recruitment signal is the new user identification information (OP103: YES), the process proceeds to OP104. In OP104, the controller 21 creates an entry in the parallel running state monitoring table corresponding to the received member recruitment signal and user identification information of the user B. Thereafter, the process illustrated in FIG. 8 ends.

In a case where the user identification information of the user B received together with the member recruitment signal is not the new user identification information (OP103: NO), the process proceeds to OP105. In OP105, the controller 21 rewrites a value of the latest time stamp field of the entry of the parallel running state monitoring table corresponding to the received member recruitment signal and user identification information of the user B to date and time received in OP102 and records the received date and time.

In OP106, the controller 21 determines whether or not the parallel running state of the ego vehicle 20A and the vehicle 20B mounted with the onboard device 2B which is the source of the member recruitment signal continues for a predetermined time or more. The determination is made on the basis of, for example, a value of the parallel running duration field of the parallel running state monitoring table corresponding to the user identification information of the user B associated with the other vehicle 20B. In a case where the parallel running state of the ego vehicle 20A and the other vehicle 20B continues for the predetermined time or more (OP106: YES), the process proceeds to OP107. In a case where the parallel running state of the ego vehicle 20A and the other vehicle 20B does not continue for the predetermined time or more (OP106: NO), the process illustrated in FIG. 8 ends.

In OP107, the controller 21 determines the parent-child relationship between the ego onboard device 2A and the other onboard device 2B, and determines whether or not the ego onboard device 2A is a parent. The parent-child relationship between the ego onboard device 2A and the other onboard device 2B may be determined, for example, on the basis of the user identification information of the user A and the user B, or for example, unique identification information of the onboard device 2 may be also transmitted together with the member recruitment signal, and the determination may be performed on the basis of the magnitude of the unique identification information. In a case where the ego onboard device 2A is the parent (OP107: YES), the process proceeds to OP108. In a case where the ego onboard device 2A is a child (OP107: NO), the process proceeds to OP109.

In OP108, the controller 21 transmits a group creation request to the center server 1 through the server communication unit 23. Along with the group creation request, the user identification information of the user A and the user B are also transmitted as candidates for group members.

In OP109, the controller 21 determines whether or not a group creation success response is received from the center server 1 through the server communication unit 23. Along with the group creation success response, a guidance message to a junction point with the other vehicle 20B may be received. In a case where the group creation success response is received (OP109: YES), the process proceeds to OP110. In a case where the group creation failure response is received (OP109: NO), the process illustrated in FIG. 6 ends, that is, any group is not created.

In OP110, the controller 21 indicates that a group of the user A and the user B of the other vehicle 20B running in parallel with the ego vehicle 20A is created, for example, on the touch panel display 212. In addition, in a case where the guidance message to the junction point with the other vehicle 20B is received together with the group creation success response, the guidance message is also displayed on the touch panel display 212. The creation of the group of the user A and the user B of the other vehicle 20B running in parallel with the ego vehicle 20A, and the guidance message may be output by voice from the speaker 213. Thereafter, the process illustrated in FIG. 8 ends.

Figure 9:
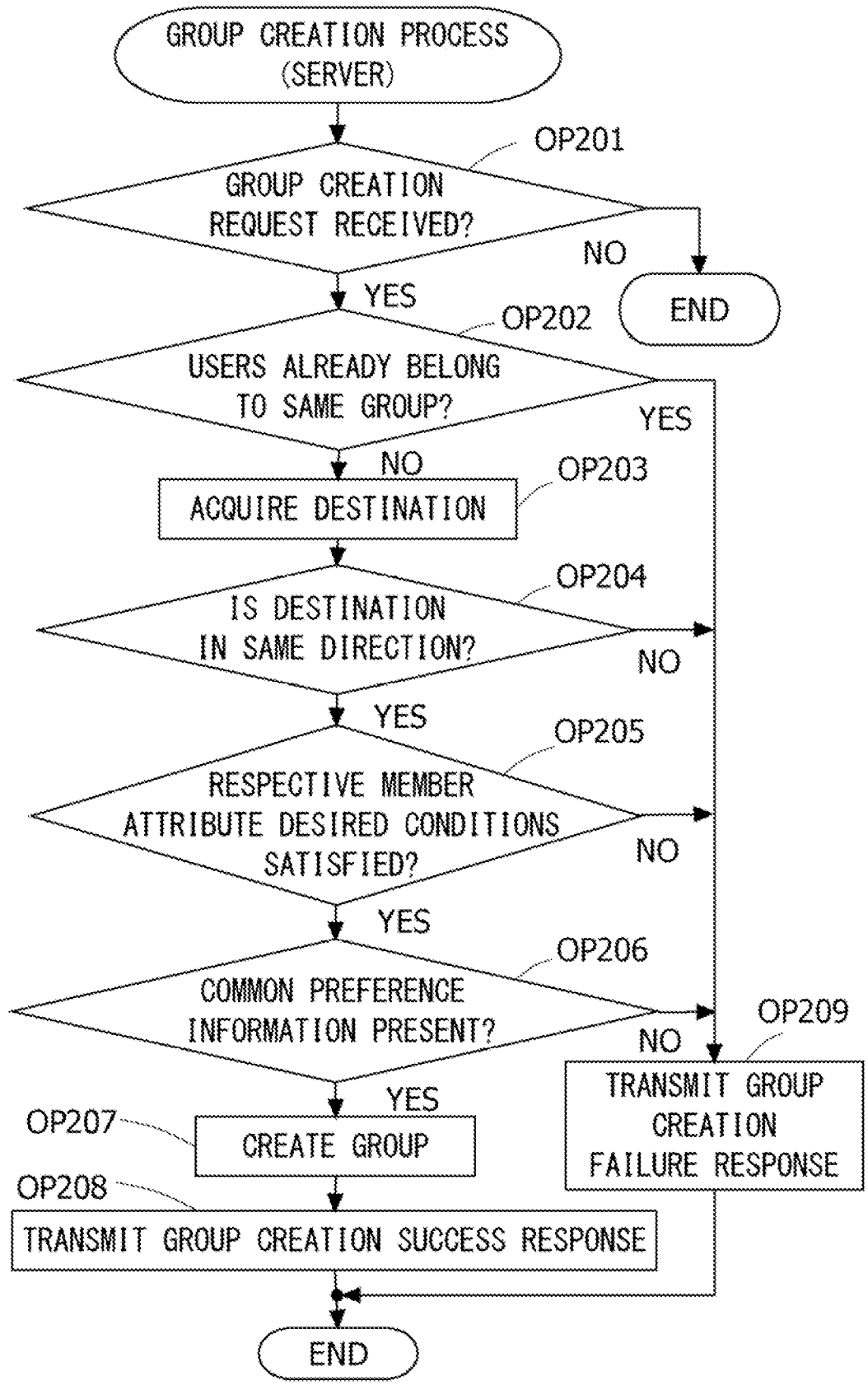
FIG. 9 illustrates an example of a flowchart of a group creation process of the center server.

FIG. 9 is an example of a flowchart of a group creation process of the center server 1. The process illustrated in FIG. 9 is repeatedly executed, for example, during operation of the center server 1. As to FIG. 9, a source of a group creation request will be described as the ego onboard device 2A, and a source of a member recruitment signal received by the ego onboard device 2A will be described as the other onboard device 2B.

In OP201, the controller 11 determines whether or not a group creation request is received from the ego onboard device 2A. Along with the group creation request, position information of the ego onboard device 2A and user identification information of the user A and the user B are also received from the ego onboard device 2A. In a case where the group creation request is received from the ego onboard device 2A (OP201: YES), the process proceeds to OP202. In a case where the group creation request is not received from the ego onboard device 2A (OP201: NO), the process illustrated in FIG. 9 ends.

In OP202, the controller 11 determines whether or not the user A and the user B indicated by the user identification information received together with the group creation request belong to the same group in a predetermined SNS. This determination is performed, for example, by acquiring an SNS account name from the user identification information of each user and inquiring the SNS server 3 about a group to which the account name belongs in a case where the user A and the user B belong to the same group in the predetermined SNS (OP202: YES), the process proceeds to OP209. In a case where the user A and the user B do not belong to the same group in the predetermined SNS (OP202: NO), the process proceeds to OP203.

In OP203, the controller 11 acquires destination information of the vehicle 20A and destination information of the vehicle 20B from the ego onboard device 2A and the other onboard device 2B, respectively. For example, a destination information acquisition request is transmitted to each onboard device 2, so that each destination information is acquired as a response. Whether or not the onboard device 2 holds the destination information depends on, for example, whether or not the destination is set in the car navigation system or the like. Further, the contact information of each onboard device 2 is acquired from the user information table.

In OP204, the controller 11 determines whether or not the directions of the destinations of the ego onboard device 2A and the other onboard device 2B are the same. In a case where the respective destinations of the ego onboard device 2A and the other onboard device 2B are in the same direction (OP204: YES), the process proceeds to OP205. In a case where the respective destinations of the ego onboard device 2A and the other onboard device 2B are not in the same direction (OP204: NO), the process proceeds to OP209. In a case where the destination information is not acquired from at least one of the ego onboard device 2A and the other onboard device 2B, OP204 is a negative determination.

In OP205, the controller 11 determines whether or not respective pieces of attribute information of the user A and the user B satisfy respective member attribute desired conditions of the user B and user A. The attribute information of each user is acquired from, for example, the user information table. The member attribute desired conditions are acquired from, for example, the member attribute desired condition information table. In a case where the respective pieces of attribute information of the user A and the user B satisfy the respective member attribute desired conditions of the user B and the user A (OP205: YES), the process proceeds to OP206. In a case where the attribute information of the user A does not satisfy the member attribute desired condition of the user B, in a case where the attribute information of the user B does not satisfy the member attribute desired condition of the user A, or in both cases (OP205: NO), the process proceeds to OP209.

In OP206, the controller 11 determines whether or not at least one part of the respective pieces of preference information of the user A and the user B is common. The preference information of each user is acquired from, for example, the user information table. In a case where at least one part of the respective pieces of preference information of the user A and the user B is common (OP206: YES), the process proceeds to OP207. In a case where there is no common part in the respective pieces of preference information of the user A and the user B (OP206: NO), the process proceeds to OP209.

In OP207, the controller 11 newly creates a group including the user A and the user B as members and registers the group in the SNS server 3. In addition, a junction point of the vehicle 20A and the vehicle 20B is determined from a resting place or a parking lot that exists in the direction of the destination from position information of the ego onboard device 2A, and a guidance message to the junction point is created. In OP208, the controller 11 transmits a group creation success response and a guidance message to each of the ego onboard device 2A and onboard device 2B. Thereafter, the process illustrated in FIG. 9 ends.

In OP209, the controller 11 does not create a new group including the user A and the user B as members, but transmits a group creation failure response to the ego onboard device 2A. Thereafter, the process illustrated in FIG. 9 ends.

The process of the center server 1 is not limited to the example illustrated in FIG. 9. For example, the determination processes of OP202, OP204, OP205, and OP206 may be performed in any order. Further, at least one determination process of OP202, OP204, OP205, and OP206 may be performed.

<Effects of First Embodiment>

In the first, embodiment, when the vehicle 20A and the vehicle 20B run in parallel for the predetermined time, the communication group including the user A and the user B as members is created. Consequently, a point of contact with a person who happens to run in parallel during driving is created, and it is possible to promote interaction between the two. In the first embodiment, the vehicle 20A and the vehicle 20B are guided to the junction place by the guidance message, and therefore the user A and the user B are more likely to join.

In the first embodiment, the user can register a desired attribute condition to the member of the group, and other user who satisfies this condition becomes a member. Consequently, the user can flexibly meet the condition desired to the member of the group.

In the first embodiment, users having common preference information become members of the group, and therefore it is easy to find a topic and it is possible to promote interaction between the users.

In the first embodiment, in a case where destinations are in different directions, and in a case where the users already belong to the same group, a group including the user as numbers is not created. Consequently, it is possible to suppress creation of an extra communication group.

Other Embodiments

The above embodiment is merely an example, and the present disclosure can be appropriately modified and implemented without departing from the gist thereof.

In the first embodiment, the center server 1, for example, may transmit a request for permission of creation of a group to the onboard device 2A and the onboard device 2B before creation of a group including the user A and the user B as members (FIG. 9, before OP207), and may obtain permission from the user A and the user B. In this case, when the permission response is received from the onboard device 2A and the onboard device 2B, the center server 1 creates the group including the user A and the user B as members.

In the first embodiment, the center server 1 determines whether or not the user A and the user B belong to the same group, but the ego onboard device 2A may perform this determination. The predetermined SNS application is installed in the ego onboard device 2A, and therefore is accessible to the SNS server 3. In this case, for example, the onboard device 2 transmits a predetermined SNS account, name together with the member recruitment signal. Consequently, the ego onboard device 2A can acquire an account name of the user B, and can acquire the information of the group to which the user B belongs.

The vehicle 20 is an automobile or a two-wheeled vehicle in the first embodiment, but the vehicle 20 may be a train. Further, the movement is not limited to that by the vehicle 20, and may be by walking. A user terminal such as a smartphone may be used instead of the onboard device 2. In a case where a smartphone or the like is used, for the member recruitment signal, wireless PAN (Personal Area Network) communication such as BLED (Bluetooth (registered trademark) Low Energy) is used rather than vehicle-to-vehicle communication.

The group is created tor two vehicles running in parallel in the first embodiment, but is not limited to this. A group of users of three or more vehicles running in parallel may be created.

The processes and means described in the present disclosure can be freely combined and implemented as long as there is no technical contradiction.

Further, the processes described as processes performed by one device may be shared and executed by a plurality of devices. Alternatively, the processes described as processes performed by different devices may be performed by one device. In the computer system, it is possible to flexibly change what kind of hardware configuration (server configuration) is used to realize each function.

The present disclosure can also be realized by supplying a computer program including the functions described in the above embodiment to the computer, and causing one or more processors of the computer to read and execute the program. Such a computer program may be provided to the computer by a non-temporary computer-readable storage medium that can be connected to a system bus of the computer, or may be provided to the computer via a network. The non-temporary computer-readable storage medium includes any type of disk such as a magnetic disk (a floppy (registered trademark) disk, a hard disk drive (HDD), etc.), and an optical disk (a CD-ROM, a DVD disk, a Blu-ray disk, etc.), a read-only memory (ROM), a random access memory (RAM), an EPROM, an EEPROM, a magnetic card, a flash memory, an optical card, and any type of medium suitable for storing electronic instructions.

What is claimed is:

1. An information processing system comprising: a server and a user terminal, wherein the server includes a first storage and a first controller connecting with the first storage, wherein the first storage stores user information including an attribute of a user of the user terminal and a Social Networking Service (SNS) account name of the user, a first condition related to a user attribute desired to a member of a communication group by the user, and user identification information identifying the user of the user terminal in association with each other, and the first controller includes at least one processor configured to:

receive, from a first user terminal, a group creation request requesting creation of a communication group including respective users of the first user terminal and at least one second user terminal, and user identification information identifying each user of the first user terminal and the at least one second user terminal, the at least one second user terminal existing in a predetermined range from the first user terminal which is moving and moving in the same direction as the first user terminal;

acquire an SNS account name corresponding to the user identification information of each user of the first user terminal and the at least one second user terminal based on the received user identification information and the SNS account name which is stored in association with the user identification information in the storage;

inquire an SNS server about belonging information indicating whether or not each SNS account name corresponding to the user identification information of the each user of the first user terminal and the at least one second user terminal belongs to the same communication group based on the acquired SNS account name, the SNS server registering communication group of the SNS;

acquire the belonging information from the SNS server;

determine whether or not the each SNS account name corresponding to the user identification information of the each user of the first user terminal and the at least one second user terminal belongs to the same communication group based on the acquired belonging information;

acquire, from the first storage, the user information and a first condition corresponding to the user identification information of the each user of the first user terminal and the at least one second user terminal in a case where the each SNS account name corresponding to the user identification information of the each user of the first user terminal and the at least one second user terminal does not belong to the same communication group;

determine for users of the first user terminal and the second user terminal, whether or not pieces of attribute in the acquired user information of the user of the first user terminal satisfy first condition of the user of the second user terminal and pieces of user attribute in the acquired user information of the user of the second user terminal satisfy the first condition of the user of the first user terminal, based on the acquired user information and first condition;

withhold to create a first communication group including respective users of the first user terminal and the second user terminal as members in a case where the respective pieces of attribute in the acquired user information do not satisfy the respective first conditions;

transmits a permission request requesting permission to create the first communication group to each of the first user terminal and the second user terminal in a case where the respective pieces of attribute in the acquired user information satisfy the respective first conditions;

create the first communication group in a case where a permission response indicating the permission to create the first communication group by both the users of the first user terminal and the second user terminal is received from each of the first user terminal and the second user terminal; register the created group in the SNS server;

create a suggesting message suggesting a place where the respective users of the first user terminal and the second user terminal meet;

and transmit a notification that the first communication group is created and the created suggesting message to the first user terminal and the second user terminal;

and the user terminal including a second storage and a second controller connecting with the second storage, wherein the second storage storing a table which stores at least one entry registering duration of continuous reception of a first signal transmitted from at least one second user terminal and second user identification information identifying each user of the at least one second user terminal in association with each other, the at least one second user terminal existing in a predetermined range from a first user terminal of a self-device which is moving and moving in the same direction as the first user terminal, and the second controller configured to:

acquire position information of the first user terminal from a Global Positioning System (GPS) receiving unit which receives the position information of the first user terminal, the GPS receiving unit connecting with the first user terminal;

acquire a detection value of an acceleration of the first user terminal from an acceleration sensor which detects the detection value of the acceleration of the first user terminal, the acceleration sensor connecting with the first user terminal;

determine whether or not the first user terminal is moving, based on change in the acquired position information of the first user terminal and the detection value of the acceleration of the first user terminal;

receive, via a terminal communication unit, the first signal transmitted in a predetermined cycle by multicast from the second user terminal by a communication method not using a relay device and the second user identification information, from the at least one second user terminal in a case where the first user terminal is moving;

measure the duration of continuous reception of the first signal transmitted from the second user terminal;

determine whether or not the received second user identification information is registered in the at least one entry stored in the table;

create an entry corresponding to the received second user identification information in the table in a case where the received second user identification information is not registered in the at least one entry;

update the duration in an entry corresponding to the received second user identification information in a case where the received second user identification information is registered in the at least one entry;

determine whether or not the duration corresponding to the second user identification information in the at least one entry is a predetermined time or more;

transmit the group creation request, the first user identification information identifying user of the first user terminal and the second user identification information, to the server, in a case where the duration corresponding to the second user identification information in the at least one entry is a predetermined time or more;

receive a notification that the first communication group is created and a suggesting message suggesting a place where the respective users of the first user terminal and the second user terminal meet, from the server;

and notify the user of the first user terminal of the notification that the first communication group is created and the suggesting message.

2. The information processing system according to claim 1, wherein the storage further stores preference information related to preference of a user, the first controller determines whether or not at least one part of the respective pieces of preference information of the user of the first user terminal and the user of the second user terminal is common, and in a case where the at least one part of the respective pieces of preference information is common, the first controller creates the first communication group, and in a case where there is no common part in the respective pieces of preference information, the first controller does not create the first communication group.

\* \* \* \* \*